Patented Sept. 19, 1922.

1,429,526

UNITED STATES PATENT OFFICE.

CURTIS J. PATTERSON, OF KANSAS CITY, MISSOURI, ASSIGNOR TO THE CAMPBELL BAKING COMPANY, OF WILMINGTON, DELAWARE, A CORPORATION OF DELAWARE.

METHOD OF DETERMINING CONDITION OF DOUGH FOR BAKERY PRODUCTS DURING FERMENTATION PROCESS.

No Drawing. Application filed August 29, 1921. Serial No. 496,770.

*To all whom it may concern:*

Be it known that I, CURTIS J. PATTERSON, a citizen of the United States, residing at Kansas City, in the county of Jackson and State of Missouri, have invented certain new and useful Improvements in Methods of Determining Condition of Dough for Bakery Products During Fermentation Process; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a method of determining the condition of dough for bakery products during the fermentation process.

Considerable difficulty is encountered in bakeries to obtain a uniform product from day to day. This is due to the fact that the condition of the sponge or dough batch is determined in a more or less haphazard manner by the baker, the accuracy of the determination being dependent upon the skill and experience of the baker who makes his conclusion from observation and by feeling the dough. Obviously, such a method cannot insure a uniform product from day to day because the skill of the different bakers will vary and even a skillful baker cannot always determine accurately just when the sponge is in its most perfect state or when the dough reaches the proper condition for baking, it being understood that the sponge is in its most perfect state and the dough reaches the proper condition for baking whenever the gluten has been properly developed.

I have discovered a method whereby a uniform dough batch can be provided from day to day by scientific analysis involving the use of the hydrogen ion concentration, the sponge being analyzed at stated periods so that the baker will have an accurate knowledge of the fermentation stage of the sponge method prior to carrying on the next step in the process of baking.

In carrying out my invention I mix the batch in the usual way, either in the sponge or dough form. This is allowed to ferment for a suitable time, for example, an hour, at approximately 80° F., preferably in a humidity controlled dough room. At the expiration of the determined period, the hydrogen ion concentration is taken by severing or breaking off a sample, say about 45 grams. This is disintegrated by combining it with about 100 c. c. of water with glass rods and shaking. An anti-ferment is introduced, for example, about 2 c. c. of toluene. When the solution is centrifuged, the clear liquid is decanted into a suitable bottle for the hydrogen ion concentration in any well known manner.

The hydrogen ion concentration can be effected by any of the well known methods but I recommend the hydrogen electrode such as is set forth in "Determinations of Hydrogen Ion" by W. Mansfield Clark, published by Williams and Wilkins Co. of Baltimore, Maryland, in 1920 as being the most feasible for this purpose.

If the result indicates that the dough batch has not reached the proper stage of fermentation, for example, O. H. 5.833, the fermentation period is prolonged and consequent tests are made from time to time until the test shows that the fermentation process has proceeded to the proper degree. Then the dough batch (if the dough batch is being tested) is sent to the machines for subdivision and preparation for the pans to be introduced into the oven.

In this manner the baker can determine with absolute accuracy when the dough batch is properly conditioned to be subdivided and prepared for baking; therefore, a uniform product can be insured for each baking.

It is to be understood, of course, that the tests for the hydrogen ion concentration may be effected from time to time until the proper result is indicated. If the test shows that the hydrogen ion concentration is insufficient, the dough batch or the sponge is allowed to ferment for a longer period when one or more subsequent tests are made.

What I claim and desire to secure by Letters-Patent is:

1. The process of determining the condition of dough for bakery products during the fermentation process which consists in mixing the dough batch, allowing the same to ferment for a suitable time, and determining the hydrogen ion concentration.

2. The process of determining the condition of dough for bakery products during the fermentation process which consists in mixing the dough batch, allowing the same to ferment for a suitable time, and determining the hydrogen ion concentration by selecting a sample of the dough batch, disintegrating by combining it with water and agitating, introducing an antiferment, centrifuging the solution, decanting into a suitable bottle, and determining the hydrogen ion concentration of the contents of the bottle.

3. The process of determining the condition of dough and sponge for bakery products which consists in allowing the gluten to develop and determining the hydrogen ion concentration of the dough.

In testimony whereof I affix my signature.

CURTIS J. PATTERSON.